Oct. 21, 1930.  A. I. RANKIN  1,778,727
COMPOSITE COATING MATERIAL
Original Filed May 22, 1929
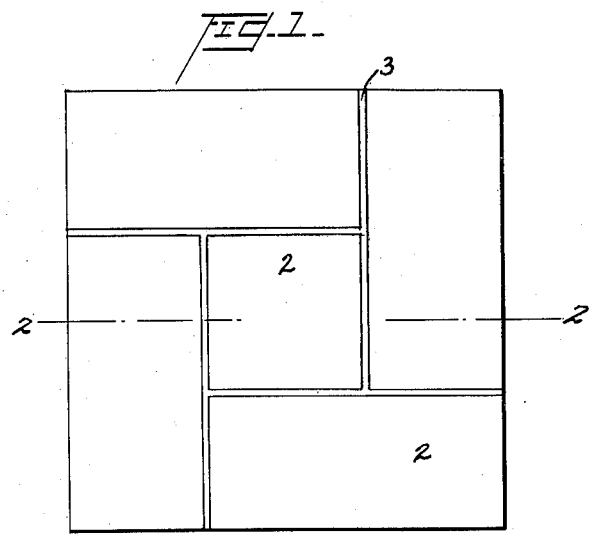
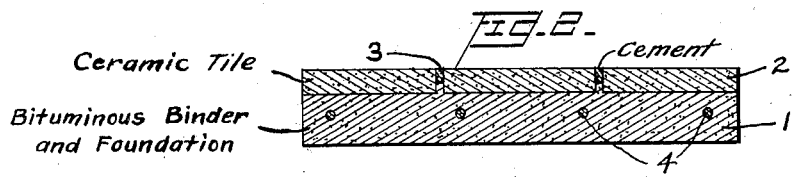
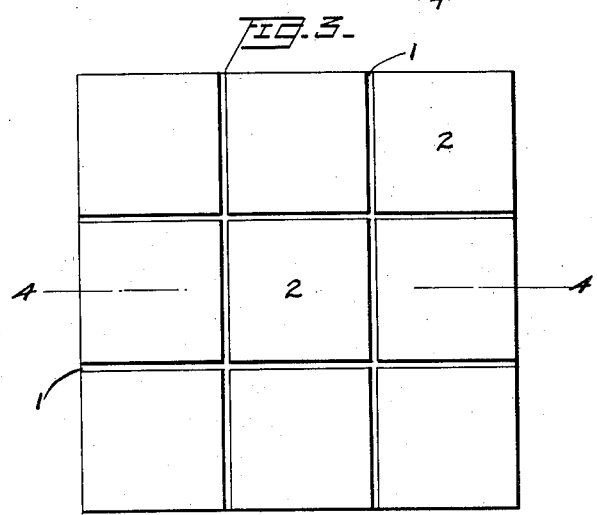
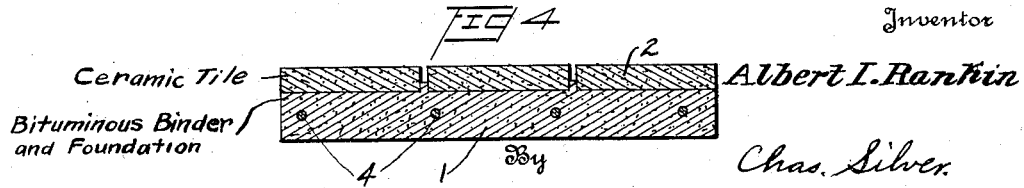
Inventor
Albert I. Rankin
By Chas. Silver.
Attorney Patented Oct. 21, 1930

1,778,727

UNITED STATES PATENT OFFICE

ALBERT I. RANKIN, OF BALTIMORE, MARYLAND

COMPOSITE COATING MATERIAL

Original application filed May 22, 1929, Serial No. 365,243. Divided and this application filed June 13, 1929. Serial No. 370,725.

This invention relates to composite coating materials having an asphaltic or bituminous binder and base in combination with another binder and surfacing material.

This application is a division of my application Ser. No. 365,243, filed May 22, 1929.

In my former application Ser. No. 343,434 I have disclosed a tile having a base and binder of bituminous material with aggregate material embedded in the bituminous material, the aggregate material extending to the top surface of the tile and arranged to give ornamental design and effect at the top surface. In such tile the bituminous material extends through the spaces or interstices between the aggregate material to the outer surface of the tile. Tile prepared in this manner is limited in the ornamental effects which may be produced, owing to the color of the asphalt or other bituminous material. Furthermore, in many cases it is undesirable to have asphaltic or bituminous material at the surface of the tile owing to its objectionable odor, the tendency to soften and blister under changing atmospheric conditions and the solubility of the asphalt or bituminous material in the polishes and dressings employed for surface cleaning and renovation. Quite often, in attempting to clean or polish a surface of this character, the appearance is objectionably marred.

Among the objects of this invention is to overcome the disadvantages incident to tile prepared by the method disclosed in my said prior application Ser. No. 343,434 and to produce a composite coating material admitting of a greater variety of ornamental effect and which may be cleaned and dressed with many of the ordinary polishes without marring the surface and appearance.

Other, further and more specific objects of this invention will become readily apparent to the persons skilled in the art from a consideration of the following description when taken with the accompanying drawings wherein:

Fig. 1 is a top plan view of the finished composite coating material embodying the novel features of my invention.

Fig. 2 is a section on line 2—2 of Fig. 1.

Fig. 3 is a top plan view of the composite coating before the novel features of my invention have been added.

Fig. 4 is a section along line 4—4 of Fig. 3.

In preparing bituminous tile according to the disclosure in my prior application Ser. No. 343,434, aggregate materials having the desired shape and thickness and preferably having a flat or smooth surface are placed upon a pan or mold with the flat or smooth surfaces in contact with the bottom of the pan. This aggregate material may have cross-sections of any one or more of the numerous geometric figures and may be natural or artificial stone and preferably of a thickness less than the ultimate thickness of the tile which is to be prepared. Ordinarily, the thickness of the aggregate is about one-half that of the tile. The aggregate material is so distributed and positioned upon the pan as to give the desired ornamental effect. In order to assure proper distribution, the flat faces of the pieces of stone or aggregate are attached by means of glue or other adhesive to a sheet of paper or thin fabric, and when the aggregate is placed in this manner within the pan the paper will separate the aggregate from the bottom of the pan but will hold the aggregate pieces in the desired spaced relation to each other. A bituminous composition is then poured into the pan and over the aggregate and the bituminus material is distributed between and over the pieces of aggregate. In the tile produced by this process, the bituminous material extends to the outer surface of the tile.

In preparing my new composition, the bituminous binder or cement 1 in the spaces or interstices between the pieces of aggregate or ceramic tile 2 is terminated short of the outer surface of the composite coating material as shown in Figs. 2 and 4. This may be accomplished by placing upon the bottom of the pan a matrix or a board of suitable material and containing shallow cells in which pieces of ceramic tile or other aggregate material are positioned with their flat or smooth faces upon the matrix or board and in proper spaced relation to each other preliminary to the addition of the asphalt or bituminous binder. The spaces between the pieces of ceramic tile or other aggregate material are then filled with sand, after which the asphalt or bituminous composition is poured over this ceramic tile or other aggregate material in sufficient amount to fill the pan or mold. This asphalt constitutes the foundation or base for the composite coating material. The mass is then compressed, which eliminates voids, spaces and air holes or pockets between the pieces of ceramic tile or other aggregate material and sides of the mold and matrix and forces some of the asphalt or bituminous composition to work its way through the sand into the spaces between the pieces of ceramic tile or other aggregate material. Upon the removal of the composite coating material from the mold, practically all of the sand will fall out from the spaces between the pieces or ceramic tile or other aggregate material, although a few grains will adhere to the bituminous foundation and the bituminous composition which has penetrated the sand. The resulting grooves between the pieces of ceramic tile or other aggregate material are then filled with Portland, hydraulic or oxy-chloride cement 3 of any desired color. The grains of sand adhering to the asphalt are of advantage in this step of my process, because they serve as teeth for the Portland, hydraulic or oxy-chloride cement and effect a better union between the binders. The resulting composite coating material will possess the advantages of the bituminous base while at the same time having a surface capable of more attractive design and which will not be marred by the ordinary polishes and dressings.

In the preferred embodiment of my invention the bituminous composition is prepared from an asphalt of high melting point to which is added about four parts of comminuted silicious filler. The bituminous composition is preferably of a stiff, pasty consistency so that when it is poured in the middle of the mold or pan it will spread properly and form a continuous mass with the ceramic tile or other aggregate material.

The bituminous materials which I employ may be either natural or artificial asphalt of sufficiently high melting point to yield a composition that is not too soft for the highest atmospheric temperatures in the summer. I may, however, use other cement binding material such as residues from the distillation and cracking of animal, vegetable and petroleum oils of asphalt, paraffine or other base. Also, in lieu of asphaltic materials, I may use pitches resulting from destructive distillation of animal and vegetable matter including those of stearin, bone fat, packing house fat, garbage, sewage, grease, etc. I may also employ compositions resulting from the fluxing of harder bituminous and asphaltic materials or pitches with petroleum residues or oils. For the filler I may use ground stone, slate, slag, cinders, clay, asbestos, etc. or any of the other suitable ground materials commonly employed as fillers in paints and molded products, and the proportion of filler to the bituminous or other base and cementing material may be from 1 part of filler to 1 part of cementing base in the richest mixtures to 10 parts of filler to 1 of cementing base in the leanest mixtures. The Portland, hydraulic and oxy-chloride cements are used in the form of a cream, water being added to these materials to give the desired consistency.

In preparing the tile, the aggregate material employed is either natural or artificial stone, including baked clay products and what is commercially known as "ceramic tile". My invention also embraces other composite coating materials wherein the natural or artificial stone is replaced in whole or in part by other suitable materials such as wood, hard or soft rubber, artificial resins, lead or other metallic blocks, etc., in order to provide a surface of the desired tread and appearance and to meet special needs.

The composite coating material resulting from my new process processes a wide variety of ornamental effects and serves excellently for floors, walls and other stationary structures, but may also be used for movable and transportable objects where a durable surface is desired. This new product also possesses considerable advantages over tile or artificial stone having a foundation of Portland or similar cement, since it can be applied upon floors and other surfaces which have been levelled and smoothed as well as upon floors which are not absolutely flat, because my new composite coating material will adjust itself to irregularities upon the surface to which it is applied and after a short while form a continuous structure therewith that is free from hollows and voids as in the case of artificial stone prepared with Portland or similar cement.

I have found it desirable in some instances to strengthen the tile or other composite coating material by means of reinforcing material 4 which may be either wire mesh, burlap or other materials employed for strengthening molded products and this reinforcing material is embedded in the bituminous material constituting the base or foundation. Also, in some instances, in order to render the tile or composite coating material non-slipping, aggregate material which will present an outer roughened surface may be used in lieu of the smooth material.

The term "ceramic tile" as employed herein is intended to cover glazed and unglazed plates and slabs of baked and fired clay, porcelain, etc.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. As a new article of manufacture, composite coating material having a base and binder of bituminous material with ceramic tile embedded in said bituminous material, said ceramic tile extending to the outer surface of said composite coating material and said bituminous material filling the spaces between the ceramic tile to a point below the outer surface of said ceramic tile and another binding material filling the spaces between the ceramic tile, extending from the bituminous material to the outer surface of said ceramic tile and arranged to give ornamental design and effect therewith at the outer surface of said composite coating material.

2. As a new article of manufacture, composite coating material having a base and binder of asphaltic material with ceramic tile embedded in said asphaltic material, said ceramic tile extending to the outer surface of said composite coating material and said asphaltic material filling the spaces between the ceramic tile to a point below the outer surface of said ceramic tile and another binding material filling the spaces between the ceramic tile, extending from the asphaltic material to the outer surface of said ceramic tile and arranged to give ornamental design and effect therewith at the outer surface of said composite coating material.

3. As a new article of manufacture, composite coating material having a homogeneous admixture of bituminous material and comminuted filler with pieces of ceramic tile embedded in said bituminous material, said ceramic tile extending to the top surface of said composite coating material and said bituminous material filling the spaces between the ceramic tile to a point below the outer surface of said composite coating material and another binding material filling the spaces between said ceramic tile, extending from the bituminous material to the outer surface of said ceramic tile and arranged to give ornamental design and effect therewith at the outer surface of said composite coating material.

4. As a new article of manufacture, composite coating material having a foundation and binder of bituminous material with ceramic tile embedded in said bituminous material, said ceramic tile extending to the outer surface of said composite coating material and said bituminous material filling the spaces between the ceramic tile to a point below the outer surface of said ceramic tile, another binding material filling the spaces between said ceramic tile, extending from the bituminous material to the outer surface of said ceramic tile and arranged to give ornamental design and effect therewith at the outer surface of said composite coating material and reinforcing means within said bituminous foundation.

5. As a new article of manufacture, composite coating material having a homogeneous admixture of bituminous material and comminuted filler with pieces of ceramic tile embedded in said bituminous material, said ceramic tile extending to the top surface of said composite coating material and said bituminous material filling the spaces between the said ceramic tile to a point below the top surface of said composite coating material, another binding material filling the spaces between said ceramic tile, extending from the bituminous material to the outer surface of said ceramic tile and arranged to give ornamental design and effect therewith at the outer surface of said composite coating material and reinforcing means within said bituminous material and below said ceramic tile.

6. As a new article of manufacture, composite coating material having a base and binder of bituminous material with surfacing material embedded in said bituminous material, said surfacing material extending to the outer surface of said composite coating material and said bituminous material filling the spaces between the said surfacing material to a point below the outer surface of said surfacing material and another binding material filling the spaces between said surfacing material, extending from the bituminous material to the outer surface of said surfacing material and arranged to give ornamental design and effect therewith at the outer surface of said composite coating material.

7. As a new article of manufacture, composite coating material having a base and binder of asphaltic material with aggregate material embedded in said asphaltic material, said aggregate material extending to the outer surface of said composite coating material and said asphaltic material filling the spaces between the aggregate material to a point below the outer surface of said aggregate material and another binding material filling the spaces between the said aggregate material, extending from the asphaltic material to the outer surface of said aggregate material and arranged to give ornamental design and effect therewith at the outer surface of said composite coating material.

8. As a new article of manufacture, composite coating material having a homogeneous admixture of bituminous material and comminuted filler with pieces of stone embedded in said bituminous material, said stone extending to the top surface of said composite coating material and said bituminous material filling the spaces between the stone to a point below the outer surface of said stone and another binding material filling the spaces between the stone, extending from the bituminous material to the outer surface of the stone and arranged to give ornamental design and effect therewith at the outer surface of said composite coating material.

9. As a new article of manufacture, composite coating material having a foundation and binder of bituminous material with surfacing material embedded in said bituminous material, said surfacing material extending to the outer surface of said composite coating material and said bituminous material filling the spaces between the said surfacing material to a point below the outer surface of said surfacing material, another binding material filling the spaces between said surfacing material, extending from the bituminous material to the outer surface of said surfacing material and arranged to give ornamental design and effect therewith at the outer surface of said composite coating material and reinforcing means within said bituminous foundation.

10. As a new article of manufacture, composite coating material having a homogeneous admixture of bituminous material and comminuted filler with pieces of stone embedded in said bituminous material, said stone extending to the top surface of said composite coating material and said bituminous material filling the spaces between the stone to a point below the top surface of the stone, another binding material filling the spaces between the stone, extending from the bituminous material to the outer surface of the stone and arranged to give ornamental design and effect therewith at the outer surface of said composite coating material and reinforcing means within said bituminous material and below said stone.

In testimony whereof I affix my signature.

ALBERT I. RANKIN.